United States Patent
Otaguro

(10) Patent No.: US 12,015,363 B2
(45) Date of Patent: Jun. 18, 2024

(54) MOTOR DRIVE CIRCUIT, MOTOR SYSTEM, AND ELECTRIC DEVICE

(71) Applicant: Rohm Co., Ltd., Kyoto (JP)

(72) Inventor: Yoshito Otaguro, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/948,468

(22) Filed: Sep. 20, 2022

(65) Prior Publication Data

US 2023/0102458 A1  Mar. 30, 2023

(30) Foreign Application Priority Data

Sep. 27, 2021  (JP) ................. 2021-156467

(51) Int. Cl.
| | |
|---|---|
| *H02P 23/00* | (2016.01) |
| *H02P 6/08* | (2016.01) |
| *H02P 6/15* | (2016.01) |
| *H02P 6/182* | (2016.01) |
| *H02P 25/00* | (2006.01) |
| *H02P 27/00* | (2006.01) |
| *H02P 27/08* | (2006.01) |

(52) U.S. Cl.
CPC ............... *H02P 27/08* (2013.01); *H02P 6/08* (2013.01); *H02P 6/15* (2016.02); *H02P 6/182* (2013.01)

(58) Field of Classification Search
CPC .... H02P 27/08; H02P 6/15; H02P 6/08; H02P 6/182
USPC ............................................... 318/811
See application file for complete search history.

(56) References Cited

U.S. PATENT DOCUMENTS

| | | | | |
|---|---|---|---|---|
| 5,317,243 | A * | 5/1994 | Cameron | H02P 6/12 318/400.35 |
| 2001/0002785 | A1* | 6/2001 | Gotou | H02P 6/085 318/700 |
| 2005/0104543 | A1* | 5/2005 | Kazanov | H05B 41/3924 315/294 |
| 2008/0218108 | A1* | 9/2008 | Niikura | H02P 6/08 318/400.3 |
| 2018/0183368 | A1* | 6/2018 | Murakami | H02P 6/185 |
| 2019/0115841 | A1* | 4/2019 | Maruyama | H02M 3/33523 |

FOREIGN PATENT DOCUMENTS

JP  2007-267552  10/2007

* cited by examiner

*Primary Examiner* — Erick D Glass
(74) *Attorney, Agent, or Firm* — Fish & Richardson P.C.

(57) ABSTRACT

A motor drive circuit includes: a PWM signal generation part configured to generate a PWM signal based on a count value of a counter; a detection part configured to detect a zero crossing of a counter electromotive voltage generated in a coil of a motor; a prediction part configured to predict an arrival timing of the zero crossing of the counter electromotive voltage; a stop part configured to stop a counting operation of the counter after a first time point going back from the arrival timing predicted by the prediction part; and a reset part configured to reset the count value at a timing at which the detection part detects the zero crossing of the counter electromotive voltage.

7 Claims, 4 Drawing Sheets

MOTOR DRIVE CIRCUIT, MOTOR SYSTEM, AND ELECTRIC DEVICE

CROSS-REFERENCE TO RELATED APPLICATION

This application is based upon and claims the benefit of priority from Japanese Patent Application No. 2021-156467, filed on Sep. 27, 2021, the entire contents of which are incorporated herein by reference.

TECHNICAL FIELD

The present disclosure relates to a motor drive circuit, a motor system, and an electric device.

BACKGROUND

Various sensorless motor drive circuits for driving a three-phase brushless motor without using a sensor such as a Hall element or the like have been developed. A sensorless motor drive circuit obtains rotation position information of a motor by monitoring a counter electromotive voltage generated in coils of a three-phase brushless motor and detecting a zero crossing of the counter electromotive voltage at which the counter electromotive voltage becomes equal to the midpoint voltage of the motor.

One performance of the motor drive circuit is rotation accuracy. If the actual rotation speed of the motor varies from the target rotation speed of the motor, the rotation accuracy deteriorates. In the conventional motor drive circuit, the rotation accuracy may deteriorate depending on the waveform of a drive voltage supplied to a three-phase brushless motor.

SUMMARY

According to one embodiment of the present disclosure, a motor drive circuit includes: a PWM signal generation part configured to generate a PWM signal based on a count value of a counter; a detection part configured to detect a zero crossing of a counter electromotive voltage generated in a coil of a motor; a prediction part configured to predict an arrival timing of the zero crossing of the counter electromotive voltage; a stop part configured to stop a counting operation of the counter after a first time point going back from the arrival timing predicted by the prediction part; and a reset part configured to reset the count value at a timing at which the detection part detects the zero crossing of the counter electromotive voltage.

According to one embodiment of the present disclosure, a motor system includes the motor drive circuit of the above configuration that is configured to drive the motor.

According to one embodiment of the present disclosure, an electric device includes the motor system of the above configuration.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
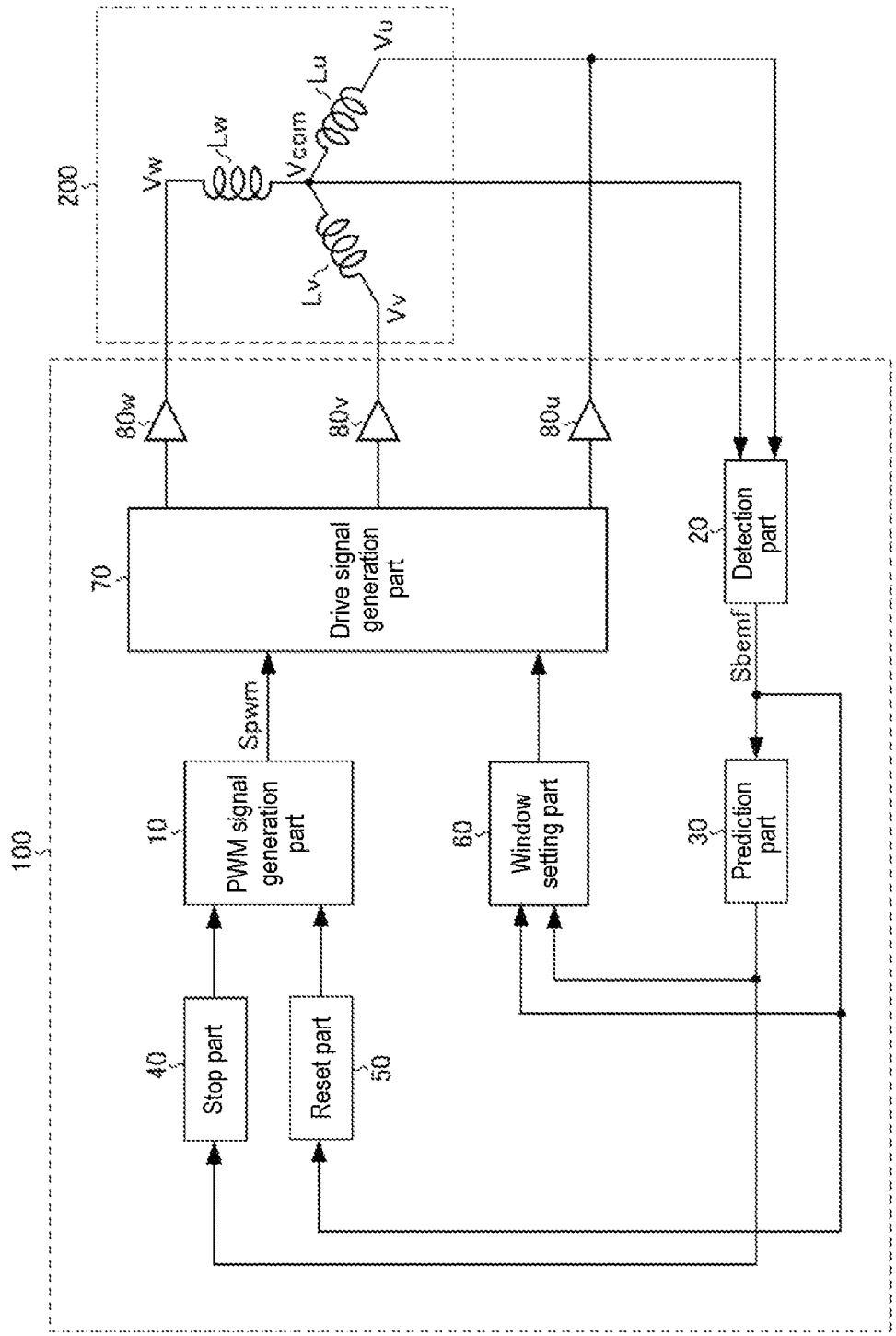
FIG. 1 is a diagram showing a schematic configuration of a motor system according to an embodiment.

FIG. 1 is a diagram showing a schematic configuration of a motor system according to an embodiment. The motor system 300 according to the embodiment includes a motor drive circuit 100 and a three-phase brushless motor 200.

The motor drive circuit 100 is configured to drive the three-phase brushless motor 200. The motor drive circuit 100 includes a PWM (Pulse Width Modulation) signal generation part 10, a detection part 20, a prediction part 30, a stop part 40, a reset part 50, a window setting part 60, a drive signal generation part 70, a U-phase switching circuit 80u, a V-phase switching circuit 80v, and a W-phase switching circuit 80w.

The three-phase brushless motor 200 includes a U-phase coil Lu, a V-phase coil Lv, and a W-phase coil L80w. The motor drive circuit 100 supplies a U-phase drive voltage Vu to a first end of the U-phase coil Lu. The motor drive circuit 100 supplies a V-phase drive voltage Vv to a first end of the V-phase coil Lv. The motor drive circuit 100 supplies a W-phase drive voltage Vw to a first end of the W-phase coil Lw. A second end of the U-phase coil Lu, a second end of the V-phase coil Lv, and a second end of the W-phase coil Lw are commonly connected. A midpoint voltage Vcom is generated at the second end of the U-phase coil Lu, the second end of the V-phase coil Lv, and the second end of the W-phase coil Lw, that is, at the midpoint of the three-phase brushless motor 200. Instead of the midpoint voltage Vcom generated at the midpoint of the three-phase brushless motor 200, a virtual midpoint voltage generated at a virtual midpoint inside the motor drive circuit 100 may be used. The virtual midpoint inside the motor drive circuit 100 is formed by star-connecting three resistors having the same resistance value.

Now, each part of the motor drive circuit 100 will be described.

Figure 3:
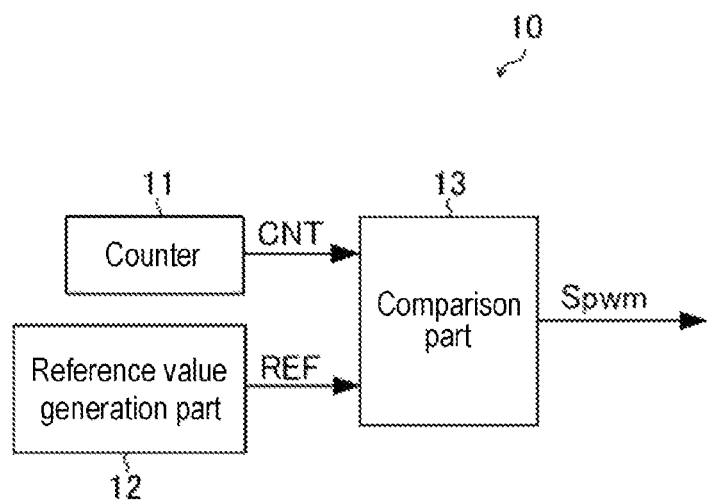
FIG. 3 is a diagram showing a configuration example of a PWM signal generation part.

The PWM signal generation part 10 is configured to generate a PWM signal based on a count value of a counter 11 (see FIG. 3). The duty of the PWM signal is set depending on the target rotation speed and the target torque of the three-phase brushless motor 200 such that each of the U-phase drive voltage Vu, the V-phase drive voltage Vv, and the W-phase drive voltage Vw becomes a sinusoidal voltage with one cycle at an electrical angle of 360 degrees.

The detection part 20 is configured to detect a zero crossing of a counter electromotive voltage generated in the U-phase coil Lu of the three-phase brushless motor 200. More specifically, the detection part 20 is configured to detect the zero crossing of the counter electromotive voltage generated in the U-phase coil Lu of the three-phase brushless motor 200 per 360 degrees in mechanical angle of the three-phase brushless motor 200.

Unlike the present embodiment, the detection part 20 may detect the zero crossing of the counter electromotive voltage generated in the U-phase coil Lu of the three-phase brushless motor 200, for example, per 360 degrees in electrical angle of the three-phase brushless motor 200. However, by detecting the zero crossing of the counter electromotive voltage per 360 degrees in mechanical angle of the three-phase brushless motor 200, it is possible to prevent a detection result of the detection part 20 from being affected by variations in a magnetization position of a rotor of the three-phase brushless motor 200.

Figure 2:
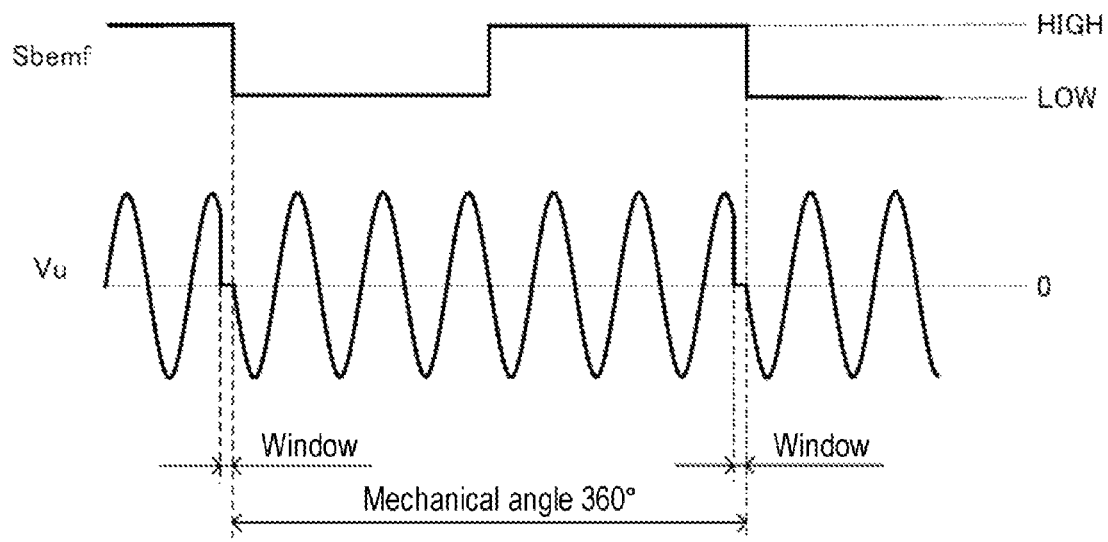
FIG. 2 is a diagram showing waveforms of an output signal of a detection part and a U-phase drive voltage.

The output signal Sbemf of the detection part 20 is changed from a HIGH level to a LOW level at a timing at which the zero crossing of the counter electromotive voltage generated in the U-phase coil Lu of the three-phase brushless motor 200 is detected (see FIG. 2). Further, the output signal Sbemf of the detection part 20 is changed from the LOW level to the HIGH level at a timing at which it is predicted that the rotor of the three-phase brushless motor 200 has been rotated by a mechanical angle of 180 degrees from the timing at which the zero crossing of the counter electromotive voltage generated in the U-phase coil Lu of the three-phase brushless motor 200 is detected (see FIG. 2).

The prediction part 30 is configured to predict an arrival timing of the zero crossing of the counter electromotive voltage generated in the U-phase coil Lu of the three-phase brushless motor 200.

Specifically, the prediction part 30 is configured to predict the arrival timing from past detection results of the detection part 20. For example, the prediction part 30 may measure an interval between the $(n-1)^{th}$ detection timing by the detection part 20 and the $n^{th}$ detection timing by the detection part 20, and may regard the timing elapsed from the $n^{th}$ detection timing by the interval as the arrival timing. Further, the prediction part 30 may, for example, measure a first interval between the $(n-3)^{th}$ detection timing by the detection part 20 and the $(n-2)^{th}$ detection timing by the detection part 20, a second interval between the $(n-2)^{th}$ detection timing by the detection part 20 and the $(n-1)^{th}$ detection timing by the detection part 20, and a third interval between the $(n-1)^{th}$ detection timing by the detection part 20 and the $n^{th}$ detection timing by the detection part 20, and may regard the timing that the average value of the first to third intervals elapses from the $n^{th}$ detection timing as the arrival timing.

The stop part 40 is configured to stop a counting operation of the counter 11 (see FIG. 3) after the first point going back from the arrival timing predicted by the prediction part 30.

Since the stop part 40 is used to improve the rotation accuracy of the three-phase brushless motor 200, the stop part 40 operates when the motor drive circuit 100 drives the three-phase brushless motor 200 at a constant target rotation speed. As a result, the motor rotation accuracy can be improved when the motor drive circuit 100 drives the three-phase brushless motor 200 at a constant target rotation speed. Conversely, when the motor drive circuit 100 accelerates or decelerates the rotation of the three-phase brushless motor 200, the stop part 40 may not be operated.

The reset part 50 is configured to reset the count value of the counter 11 (see FIG. 3) at the timing at which the detection part 20 detects the zero crossing of the counter electromotive voltage generated in the U-phase coil Lu of the three-phase brushless motor 200.

Since the reset part 50 is used to improve the rotation accuracy of the three-phase brushless motor 200, the reset part 50 operates when the motor drive circuit 100 drives the three-phase brushless motor 200 at a constant target rotation speed. As a result, the motor rotation accuracy can be improved when the motor drive circuit 100 drives the three-phase brushless motor 200 at a constant target rotation speed.

The window setting part 60 sets a window (see FIG. 2) to stop switching of the U-phase switching circuit 80u that outputs the U-phase drive voltage Vu, so that the U-phase drive voltage Vu does not interfere with monitoring the counter electromotive voltage generated in the U-phase coil Lu of the three-phase brushless motor 200. That is, the U-phase switching circuit 80u is not driven during the period of the window.

The drive signal generation part 70 generates a U-phase drive signal based on the PWM signal Spwm and the window, and outputs the U-phase drive signal to the U-phase switching circuit 80u. The U-phase switching circuit 80u turns on a high-side switch and turns off a low-side switch according to the U-phase drive signal when the PWM signal Spwm is at the HIGH level. Further, the U-phase switching circuit 80u turns off the high-side switch and turns on the low-side switch of the U-phase switching circuit 80u according to the U-phase drive signal when the PWM signal Spwm is at the LOW level. However, during the period of the window, the drive signal generation part 70 turns off both the high-side switch and the low-side switch according to the U-phase drive signal regardless of the level of the PWM signal Spwm.

The drive signal generation part 70 generates a V-phase drive signal based on the PWM signal Spwm, and outputs the V-phase drive signal to the V-phase switching circuit 80v. The V-phase drive voltage Vv outputted from the V-phase switching circuit 80v is shifted from the U-phase drive voltage Vu by an electrical angle of 120 degrees, and is a voltage not having a window existing in the U-phase drive voltage Vu.

The drive signal generation part 70 generates a W-phase drive signal based on the PWM signal Spwm, and outputs the W-phase drive signal to the W-phase switching circuit 80w. The W-phase drive voltage Vw outputted from the W-phase switching circuit 80w is shifted from the U-phase drive voltage Vu by an electrical angle of 240°, and is a voltage not having a window existing in the U-phase drive voltage Vu.

FIG. 3 is a diagram showing a configuration example of the PWM signal generation part 10. In the configuration example shown in FIG. 3, the PWM signal generation part 10 includes the counter 11, a reference value generation part 12, and a comparison part 13.

In a countdown operation, the counter 11 decrements the count value CNT by one for each clock cycle. When the count value CNT reaches 0 or the count value CNT is reset by the reset part 50, the counter 11 resets the count value CNT to the initial value in the next clock cycle.

The reference value generation part 12 generates a reference value REF. The reference value REF is set according to a target rotation speed and a target torque of the three-phase brushless motor 200 so that each of the U-phase drive voltage Vu, the V-phase drive voltage Vv, and the W-phase drive voltage Vw becomes a sinusoidal voltage with one cycle at an electrical angle of 360 degrees.

The comparison part 13 compares the count value CNT with the reference value REF. When the count value CNT exceeds the reference value REF, the comparison part 13 sets the PWM signal Spwm to a LOW level. On the other hand, when the count value CNT does not exceed the reference value REF, the comparison part 13 sets the PWM signal Spwm to a HIGH level.

Figure 4:
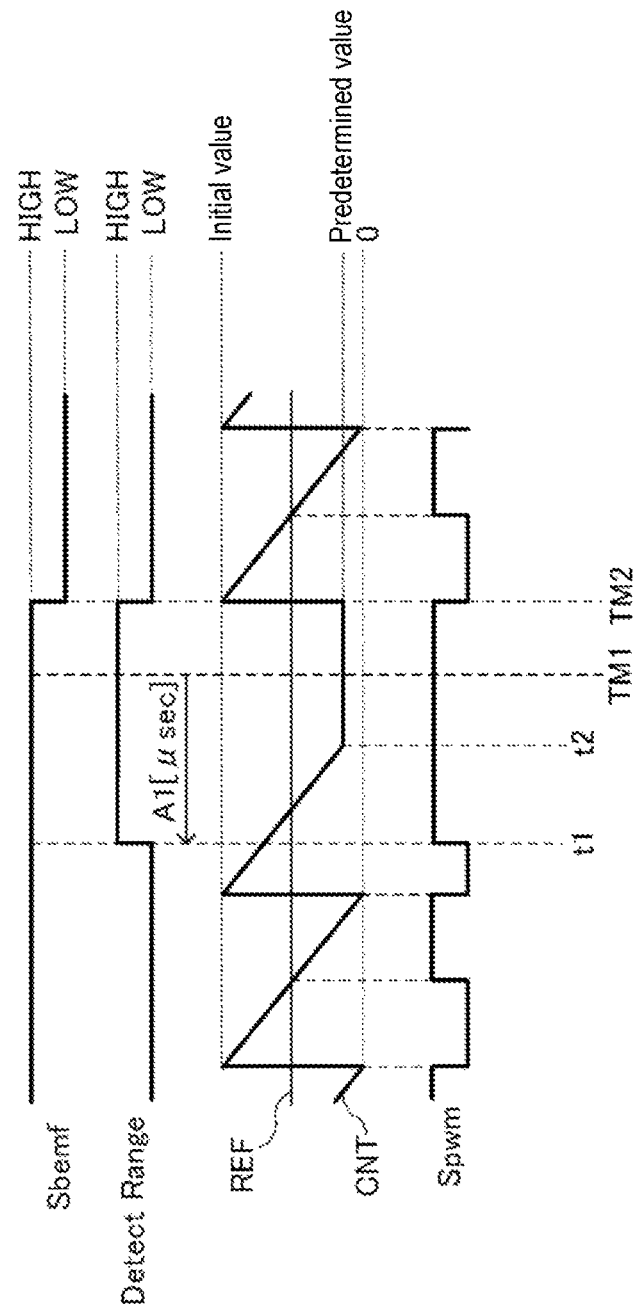
FIG. 4 is a diagram showing waveforms of a PWM signal, etc.

FIG. 4 is a diagram showing waveforms of the PWM signal Spwm, etc. More specifically, FIG. 4 is a diagram showing the waveforms of the PWM signal Spwm, etc. when the motor drive circuit 100 drives the three-phase brushless motor 200 at a constant target rotation speed, and is a diagram showing the waveform of the PWM signal Spwm before and after the arrival timing of the zero crossing of the counter electromotive voltage generated in the U-phase coil Lu of the three-phase brushless motor 200 which is predicted by the prediction part 30.

In addition, in FIG. 4, the count value CNT is illustrated like an analog value for the sake of convenience. However, the count value CNT is actually a digital value.

The prediction part 30 predicts the arrival timing TM1 at which the counter electromotive voltage generated in the U-phase coil Lu of the three-phase brushless motor 200 reaches zero crossing for each rotation of the rotor of the three-phase brushless motor 200.

The stop part 40 sets a timing pulse signal Detect Range to a HIGH level at first time point t1 which goes back by a predetermined time A1 [μsec] from the arrival timing TM1. The timing pulse signal Detect Range is a signal used in the stop part 40. When the timing pulse signal Detect Range is at a HIGH level, the PWM signal Spwm is also forcibly set to a HIGH level.

The stop part 40 stops the counting operation of the counter 11 at time t2 when the timing pulse signal Detect Range is at a HIGH level and the count value CNT reaches a predetermined value (0<predetermined value<initial value).

Then, the reset part 50 resets the count value of the counter 11 at timing TM2 at which the detection part 20 detects the zero crossing of the counter electromotive voltage generated in the U-phase coil Lu of the three-phase brushless motor 200.

By resetting the count value with the reset part 50, each rotation drive of the rotor of the three-phase brushless motor 200 starting from timing TM2 at which the detection part 20 detects the zero crossing of the counter electromotive voltage generated in the U-phase coil Lu of the three-phase brushless motor 200 can be started using the same waveform of each phase drive voltage.

Further, the PWM signal Spwm can be fixed to a HIGH level from time t2 at which the count value CNT reaches a predetermined value to timing TM2 at which the detection part 20 detects the zero crossing of the counter electromotive voltage generated in the U-phase coil Lu of the three-phase brushless motor 200. By resetting the count value with the reset part 50 and fixing the PWM signal Spwm to the HIGH level, it is possible to improve the reproducibility of the waveforms of respective phase drive voltages during the rotation drive of the rotor of the three-phase brushless motor 200.

Accordingly, it is possible to improve the rotation accuracy of the three-phase brushless motor 200.

Further, in the present embodiment, the count operation of the counter 11 is stopped at time t2 at which the count value CNT reaches a predetermined value (0<predetermined value<initial value). Therefore, it is possible to prevent the unintended level change of the PWM signal Spwm. As a result, it is possible to reliably improve the rotation accuracy of the three-phase brushless motor 200.

It is desirable that the predetermined time A1 [μsec] is longer than the cycle of the PWM signal Spwm. As a result, the PWM signal Spwm can be fixed at a HIGH level for a relatively long period of time immediately before the timing at which the detection part 20 detects the zero crossing of the counter electromotive voltage. This makes it possible to further improve the rotation accuracy of the three-phase brushless motor 200.

Figure 5:
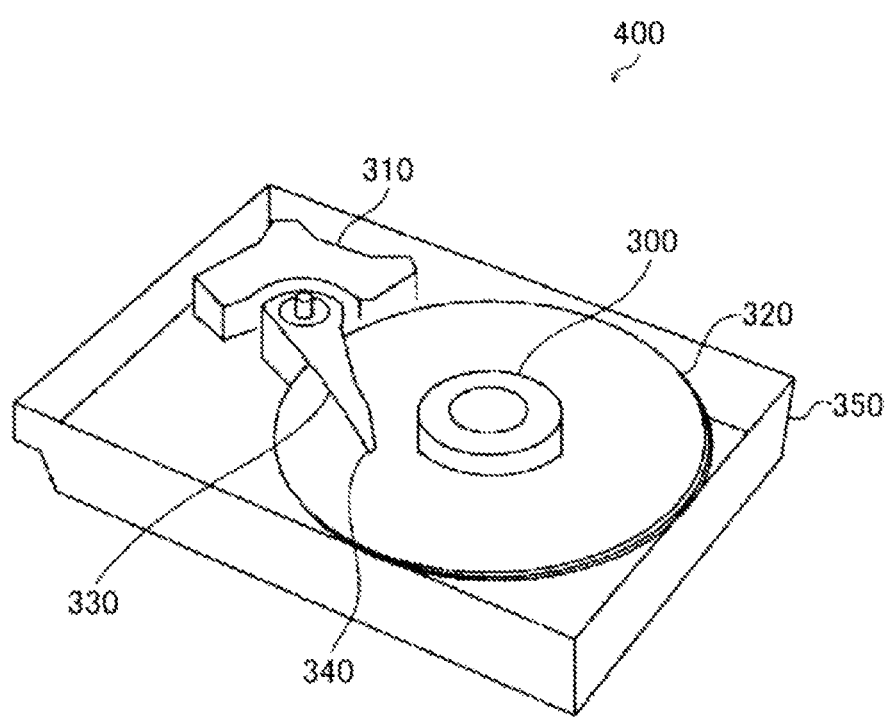
FIG. 5 is a diagram showing a schematic configuration of a hard disk device.

A motor system 300 (hereinafter abbreviated as "motor system 300") according to the embodiment is mounted on, for example, a hard disk device 400 shown in FIG. 5. The hard disk device 400 shown in FIG. 5 includes a motor system 300, a voice coil motor 310, a magnetic disk 320, a swing arm 330, a magnetic head 340, and a housing 350. The motor system 300, the voice coil motor 310, the magnetic disk 320, the swing arm 330, and the magnetic head 340 are accommodated inside the housing 350. The motor system 300 is utilized as a spindle motor.

The magnetic disk 320 is a hard disk having a magnetic material on its surface. The number of magnetic disks 320 may be plural or singular. The motor system 300 rotates the magnetic disk 320 at a high speed. The magnetic head 340 reads and writes data from and on the magnetic disk 320 by generating a magnetic field. The magnetic head 340 is attached to the tip of the swing arm 330.

The swing arm 330 swings about its axis with respect to the rotating magnetic disk 320. The voice coil motor 310 is an actuator that drives swing arm 330. The voice coil motor 310 is driven by the magnetic field action between coils 310 through which a current flows and magnets. Of course, the motor system 300 may be installed in an electric device other than the hard disk device 400, such as a fan, a printer, or the like.

The configuration of the present disclosure may be modified in various ways in addition to the above-described embodiment without departing from the gist of the present disclosure. The above-described embodiment should be considered illustrative in all respects and not restrictive. The technical scope of the present disclosure is defined by the claims rather than the description of the embodiment. It should be understood that all modifications that fall within the meaning and range of equivalents of the claims are included within the technical scope of the present disclosure.

For example, in the above-described embodiment, the zero crossing of the counter electromotive voltage is detected only for the U phase. However, the zero crossing of the counter electromotive voltage may be detected in each of the U phase, the V phase, and the W phase.

Further, for example, in the above-described embodiment, the counter performs the countdown operation. However, the counter may perform a count-up operation, or the counter may perform both the countdown operation and the count-up operation in order.

Further, for example, in the above-described embodiment, the window is set because of the so-called 180-degree conduction. However, the window may not be set in the case of the so-called 180-degree conduction, for example.

The motor drive circuit (100) described above includes: a PWM signal generation part (10) configured to generate a PWM signal based on a count value of a counter (11); a detection part (20) configured to detect a zero crossing of a counter electromotive voltage generated in a coil of a motor (200); a prediction part (30) configured to predict an arrival timing of the zero crossing of the counter electromotive voltage; a stop part (40) configured to stop a counting operation of the counter after a first time point going back from the arrival timing predicted by the prediction part (30); and a reset part (50) configured to reset the count value at a timing at which the detection part detects the zero crossing of the counter electromotive voltage (first configuration).

The motor drive circuit of the first configuration can improve the rotation accuracy of the motor.

In the motor drive circuit of the first configuration, the stop part may be configured to stop the counting operation at a second time point at which the count value reaches a predetermined value (second configuration).

The motor drive circuit of the second configuration can prevent unintended level change of the PWM signal. As a result, it is possible to reliably improve the rotation accuracy of the motor.

In the motor driving circuit of the first or second configuration, the prediction part may be configured to predict the arrival timing from past detection results of the detection part (third configuration).

In the motor drive circuit of the third configuration, the prediction part can easily predict the arrival timing.

In the motor drive circuit of any one of the first to third configurations, the detection part may be configured to detect the zero crossing of the counter electromotive voltage for every mechanical angle of 360 degrees of the motor (fourth configuration).

In the motor drive circuit of the fourth configuration, it is possible to prevent the detection results of the detection part from being affected by the variations in the magnetization position of a rotor of the motor. As a result, it is possible to further improve the rotation accuracy of the motor.

In the motor drive circuit of any one of the first to fourth configurations, the stop part and the reset part may be configured to operate when the motor is driven at a constant target rotation speed (fifth configuration).

In the motor drive circuit of the fifth configuration, it is possible to improve the rotation accuracy of the motor when the motor is driven at a constant target rotation speed.

In the motor drive circuit of any one of the first to fifth configurations, the length of time that goes back from the arrival timing to the first time point may be longer than the period of the PWM signal (sixth configuration).

In the motor drive circuit of the sixth configuration, the level of the PWM signal can be fixed for a relatively long period of time immediately before the timing at which the zero crossing of the counter electromotive voltage is detected by the detection part. As a result, it is possible to further improve the rotation accuracy of the motor.

The motor system (300) described above includes a motor (200) and the motor drive circuit of any one of the first to sixth configurations configured to drive the motor (seventh configuration).

The motor system of the seventh configuration can improve the rotation accuracy of the motor.

The electric device (400) described above includes the motor system of the seventh configuration (eighth configuration).

The electric device of the eighth configuration can improve the rotation accuracy of the motor.

According to the motor drive circuit, the motor system, and the electric device disclosed herein, it is possible to improve the rotation accuracy of the motor.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor drive circuit, comprising:
   a PWM signal generation part configured to generate a PWM signal based on a count value of a counter;
   a detection part configured to detect a zero crossing of a counter electromotive voltage generated in a coil of a motor;
   a prediction part configured to predict an arrival timing of the zero crossing of the counter electromotive voltage;
   a stop part configured to stop a counting operation of the counter after a time point at which the count value reaches a predetermined value, during a predetermined time period after a time point going back from the arrival timing predicted by the prediction part; and
   a reset part configured to reset the count value at a timing at which the detection part detects the zero crossing of the counter electromotive voltage.

2. The motor drive circuit of claim 1, wherein the prediction part is configured to predict the arrival timing from past detection results of the detection part.

3. The motor drive circuit of claim 1, wherein the detection part is configured to detect the zero crossing of the counter electromotive voltage for each mechanical angle of 360 degrees of the motor.

4. The motor drive circuit of claim 1, wherein the stop part and the reset part are configured to operate when the motor is driven at a constant target rotation speed.

5. The motor drive circuit of claim 1, wherein a length of a time between the arrival timing and the time point going back from the arrival timing is longer than a cycle of the PWM signal.

6. A motor system, comprising:
   the motor; and
   the motor drive circuit of claim 1 configured to drive the motor.

7. An electric device, comprising:
   the system of claim 6.

* * * * *